United States Patent [19]
McMillen et al.

[11] Patent Number: 4,969,666
[45] Date of Patent: Nov. 13, 1990

[54] PAINT TUBING FLUSHING ADAPTER

[75] Inventors: Ronald R. McMillen, Minneapolis; Steven R. Arvidson, Brooklyn Park, both of Minn.

[73] Assignee: Wagner Spray Tech Corporation, Minneapolis, Minn.

[21] Appl. No.: 389,121

[22] Filed: Aug. 3, 1989

[51] Int. Cl.$^5$ .......................................... F16L 21/00
[52] U.S. Cl. ...................................... 285/8; 285/132; 285/423; 285/906
[58] Field of Search ............... 285/8, 177, 137.1, 132, 285/423, 906

[56] References Cited

U.S. PATENT DOCUMENTS

| | | | |
|---|---|---|---|
| Re. 20,593 | 12/1937 | Weiss | 285/8 |
| 865,860 | 9/1907 | Brown | 285/8 |
| 2,663,325 | 12/1953 | Bede | 285/137.1 |
| 3,844,586 | 10/1974 | Olen | 285/8 |
| 3,848,902 | 11/1974 | Modrey | 285/137.1 |
| 3,944,261 | 3/1976 | Reed et al. | 285/177 X |

FOREIGN PATENT DOCUMENTS 63-168077 of 0000 Japan.

OTHER PUBLICATIONS

The Portable Painting Machine A 9800 Operating Instructions-Asahipen.

Primary Examiner—Dave W. Arola
Attorney, Agent, or Firm—Faegre & Benson

[57] ABSTRACT

A faucet adapter for flushing paint from portable painting equipment tubing has a first end formed of an elastomer with an internal conical recess for coupling to one of a plurality of faaucet nozzles having varying diameters and a second end having a pair of hollow external conical projections of differing diameters, each for coupling to one of a pair of matching diameter lumens in portable painting equipment tubing with the hollow projections communicating with the internal conical recess for permitting the flow of liquid therethrough.

8 Claims, 1 Drawing Sheet

PAINT TUBING FLUSHING ADAPTER

BACKGROUND OF THE INVENTION

In the past it has been known to utilize flushing adapters having threads for connecting to a garden hose fitting or faucet, on one end of the adapter, and having a second threaded portion for connection to a hose fitting utilized in portable painting apparatus, such as is connected to a roller for painting. Such an adapter was limited to being connected to the specific mating threads on the faucet and the hose coupling and thus was not versatile and could not be used for tubing without the threaded fitting.

It has also been known to utilize paint flushing adapters having a rubber boot at one end and a single nozzle at the other end for connection to tubing to clean paint from the tubing. Such a structure required a plurality of adapters when there were a plurality of sizes of tubing to be cleaned. This increased the cost and complexity of such systems, and required selection of the proper adapter for the application.

DETAILED DESCRIPTION

Figure 1:
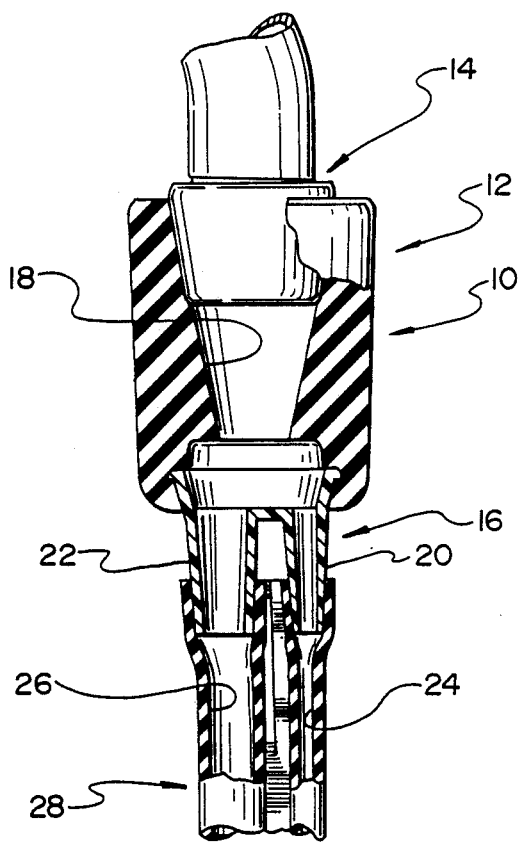
FIG. 1 is a fragmentary side elevational view of the distal end of a conventional faucet having the invention attached thereto and having parts broken away.

Referring now to the Figures, the paint tubing flushing adapter 10 of the present invention may be seen. In this embodiment, adapter 10 is preferably formed of a first end 12 formed of a elastomer or other relatively resilient material such as synthetic rubber which is sufficiently resilient to permit radial deformation when the adapter 10 is received on a faucet nozzle 14. Adapter 10 further has a second end 16 which may be formed of relatively rigid material, such as a plastic. Alternatively, the first and second ends 12, 16 may be formed of the same material.

First end 12 further has an internal conical recess 18 for coupling adapter 10 to one of a plurality of faucet nozzles having varying diameters by frictional interengagement between nozzle 14 and recess 18.

Second end 16 preferably has a pair of hollow external conical projections 20, 22 for coupling adapter 10 to one of a pair of matching diameter lumens 24, 26 in portable painting equipment tubing 28. It is to be understood that hollow projections 20, 22 are in communication with recess 18 to permit flow of liquid therethrough.

Figure 2:
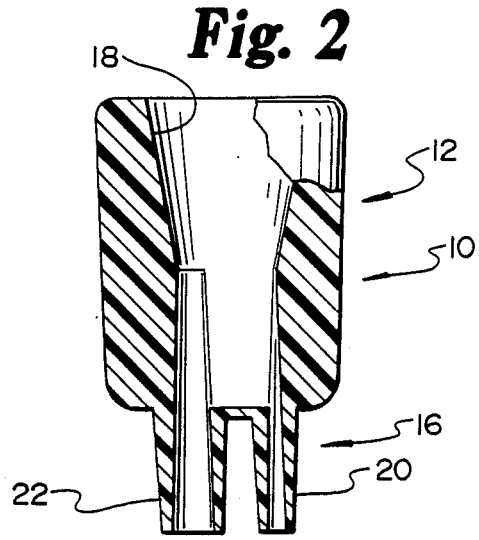
FIG. 2 is a view similar to FIG. 1 showing an alternative embodiment of the present invention.
Figure 3:
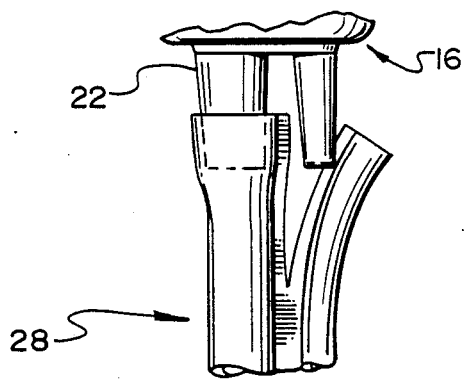
FIG. 3 is a fragmentary detailed view with a large lumen tubing connected thereto.
Figure 4:
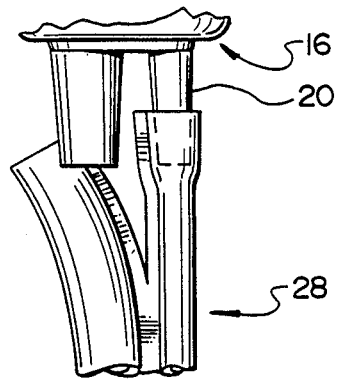
FIG. 4 is a view similar to that of FIG. 3 but with a small lumen tubing connected thereto.

Referring now more particularly to FIG. 2, adapter 10 may have first and second ends 12, 16 formed of the same material in an alternative embodiment.

In operation, first end 12 is preferably received on a faucet nozzle 14, and either one or both lumens 24, 26 of tubing 28 are placed over the corresponding conical projections 20, 22.

Water is then caused to flow through recess 18, projections 20, 22 and tubing 28, thus flushing paint from tubing 28.

The invention is not to be taken as limited to all of the details thereof as modifications and improvements may be made while remaining within the spirit and scope of the invention as claimed.

What is claimed is:

1. A faucet adapter for flushing paint from portable painting equipment tubing comprising:
   (a) a first end formed of an elastomer and having an internal conical recess surrounded throughout the extent thereof by a relatively thick cross-section side wall for coupling to one of a plurality of faucet nozzles having varying diameters by frictional interengagement between said one nozzle and said recess; and
   (b) a second end having a pair of hollow external conical projections of differing diameters each defined by a side wall having a cross-section of less thickness than any portion of said side wall surrounding said conical recess for coupling to one of a pair of matching diameter lumens in portable painting equipment tubing, said hollow projections in communication with said recess of said first end for permitting the flow of liquid therethrough.

2. The adapter of claim 1 wherein said first end is formed of a relatively resilient material and said second end is formed of relatively rigid material.

3. The adapter of claim 1 wherein said first end and said second end are formed of the same material.

4. The adapter of claim 1 wherein said first end and said second end are formed of different materials.

5. The adapter of claim 1 wherein said first end of said adapter is sufficiently resilient to permit radial deformation of said first end when said adapter is received on a faucet nozzle.

6. The adapter of claim 1 in combination with portable painting equipment tubing having a lumen corresponding in diameter to one of said conical projections.

7. The adapter of claim 1 in combination with portable painting equipment tubing having a lumen corresponding in diameter to the other of said conical projections.

8. The adapter of claim 1 in combination with portable painting equipment tubing having a pair of lumens simultaneously interfitting with said pair of conical projections.

* * * * *